United States Patent
Rudolf et al.

(10) Patent No.: US 6,674,819 B2
(45) Date of Patent: Jan. 6, 2004

(54) CHANNEL ESTIMATION BY PHASE MULTIPLEXED COMPLEMENTARY SEQUENCES

(75) Inventors: Marian Rudolf, Rennes (FR); Bruno Jechoux, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 385 days.

(21) Appl. No.: 09/740,863

(22) Filed: Dec. 21, 2000

(65) Prior Publication Data

US 2001/0024480 A1 Sep. 27, 2001

(30) Foreign Application Priority Data

Dec. 30, 1999 (FR) .............................. 99 16849

(51) Int. Cl.$^7$ .............................................. H04L 27/06
(52) U.S. Cl. ....................... 375/343; 375/340
(58) Field of Search ................. 375/259, 130, 375/316, 329, 295, 340, 343

(56) References Cited

U.S. PATENT DOCUMENTS

| 5,341,177 | A | * | 8/1994 | Roy et al. ................... 348/614 |
| 5,805,107 | A | * | 9/1998 | Schroth et al. ............. 342/189 |
| 6,404,732 | B1 | | 6/2002 | Van Nee | |
| 6,452,958 | B1 | * | 9/2002 | Van Nee ..................... 375/130 |
| 6,526,091 | B1 | | 2/2003 | Nystrom et al. | |

FOREIGN PATENT DOCUMENTS

| EP | 0 379 609 | 8/1990 |
| EP | 0 598 655 | 5/1994 |
| WO | WO 00/54424 | * 9/2000 ........... H04B/1/707 |

OTHER PUBLICATIONS

R. Sivaswamy, Multiphase Complementary Codes, IEEE 1978, vol. IT–24, No. 5, p.p. 546–552.*
Popovie, Efficient Golay Correlator, IEEE 1999, p.p. 1427–1478.*
Xiang et al, On Aperiodic and Periodic Complemntary Binary Sequences, IEEE 1999, vol. 45, No. 1, p.p. 296–303.*
U.S. patent application Ser. No. 09/740,863, filed Dec. 21, 2000, pending.
U.S. patent application Ser. No. 09/749,543, filed Dec. 28, 2000, pending.
S. Foster, ICASSP 86 Proceedings, IEEE–IECEJ–ASJ International Conference on Acoustics, Speech and Signal Processing (Cat. No. 86CH2243–4), vol. 2, pps. 929–932, "Impulse Response Measurement Using Golay Codes," Apr. 7–11, 1986.
C. Tellambura, et al., IEEE Communications Letters, vol. 2, No. 5, ps. 140–142, "Channel Estimation Using Aperiodic Binary Sequences," May 1998.

(List continued on next page.)

*Primary Examiner*—Temesghen Ghebretinsae
(74) *Attorney, Agent, or Firm*—Oblon, Spivak, McClelland, Maier & Neustadt, P.C.

(57) ABSTRACT

A method for estimating responses in a transmission or telecommunications channel in which a composite signal of complementary sequences such as:

$$\Phi_{s,s}(n)+\Phi_{g,g}(n)=k\cdot\delta(n)$$

is constructed and in which a pair of complementary sequences s(n) and g(n) is transmitted after having multiplexed the pair of complementary sequences in phase.

7 Claims, 3 Drawing Sheets

OTHER PUBLICATIONS

V. Braun, Conference Record (Cat No. 96CH35942), Proceedings of Globecom '96 . 1996 IEEE Global Telecommunications Conference, vol. 2, pps. 963–967, "On Impulse Response Measurement Techniques For Linear Tape Recording Channels," Nov. 18–22, 1996.

R.L. Frank, IEEE Transactions on Information Theory, vol. IT–26, No. 6, pps. 641–647, "Polyphase Complementary Codes," Nov. 1980.

* cited by examiner

CHANNEL ESTIMATION BY PHASE MULTIPLEXED COMPLEMENTARY SEQUENCES

DISCUSSION OF THE BACKGROUND

1. Field of the Invention

The present invention relates to a method of estimating a transmission or telecommunications channel which uses complementary sequences. The method results either in obtaining an optimal estimation of the phase and of the attenuation in the case of a single-path channel if the arrival time of the signal is known, or in obtaining a very effective estimation of the delays, phases and attenuations of the different paths in the case of a multipath channel. The method also makes it possible to obtain an estimation in the case of a channel of which it is not possible to distinguish the different paths or in the case of a multipath channel, of which one of the paths is very powerful in comparison with all the others, as long as the arrival time of the signal is known.

2. Background of the Invention

In a telecommunications system, information circulates between transmitters and receivers through-channels. In this connection, FIG. 1 illustrates a model, which is discrete in time, of the transmission chain between a transmitter 1 and a receiver 2 through a transmission channel 3. As a general rule, the transmission channels can correspond to different physical, radio, wire, optical media etc., and to different environments, fixed or mobile communications, satellites, submarine cables, etc.

As a result of the multiple reflections of which the waves emitted by transmitter 1 can be the object, channel 3 is a multipath channel which is generally modelled as FIG. 1 indicates. It is then considered to be a shift register 30 comprising L serial cells (referred to by a subscript k able to take values of between 1 and L) and the contents of which are shifted towards the right of FIG. 1 each time a symbol arrives at its input. The output of each cell with the subscript k is applied to a filter 31 representing the interference undergone by this output and introducing an attenuation of the amplitude $a_k$, a phase shift $\alpha_k$ and a delay $r_k$. The outputs of the filters are summed in a summer 32. The total impulse response thus obtained is marked h(n).

The output of summer 32 is applied to the input of an adder 33 which receives, moreover, a random signal, modelled by a Gaussian white noise, w(n) which corresponds to the thermal noise which is present in the telecommunications system.

In FIG. 1, the reference h(n) has been used, in channel 3, for the register 30, the filters 31 and the summer 32, followed by an adder which adds the noise w(n).

It will be understood that, if the transmitter 1 transmits the signal e(n), the signal received r(n), in the receiver 2, is thus:

$$r(n) = e(n) * h(n) + w(n)$$

$$= e(n) * \sum_{k=1}^{L} a_k \delta(n - r_k) e^{j\alpha_k} + w(n)$$

$$= \sum_{k=1}^{L} a_k e(n - r_k) e^{j\alpha_k} + w(n)$$

In these expressions $$h(n) = \sum_{k=1}^{L} a_k \delta(n - r_k) e^{j\alpha_k}$$

denotes the impulse response of the channel, $\delta(n)$ being the Dirac impulse. The operator * denotes the convolution product, defined by the following relation:

$$c(n) = a(n) * b(n) = \sum_{m=-\infty}^{+\infty} a(m) \cdot b(n - m)$$

Thus it is generally necessary to determine the characteristics of channel 3, at a given moment, in order to thwart the induced distortion of the transmitted signal e(n). In order to obtain an estimation of h(n), i.e. of the coefficients $a_k$, $r_k$ and $\alpha_k$ of the model of channel 3, it is necessary to repeat this operation at a greater or lesser frequency depending on the rate at which the characteristics of the channel evolve.

A widespread method of estimating the channel consists in transmitting, via transmitter 1, signals e(n) which are predetermined and known to receiver 2, and in comparing the signals received r(n) in receiver 2, by means of a periodic or a periodic correlation, with those which are expected there in order to deduce from them the characteristics of the channel. The a periodic correlation of two signals of length N has a total length 2N−1 and is expressed, from the convolution product, by the relation:

$$\varphi_{a,b}(n) = a^*(-n) * b(n) = \sum_{m=0}^{N-1} a(m) \cdot b(m + n)^{(1)},$$

$$[m] = 0, 1, \ldots, N - 1$$

for two signals a(n) and h(n) of finite length N, where the operator * denotes the complex conjugate operation.

The correlation of the received signal r(n) with the known transmitted signal e(n) translates as:

$$r(n) * e^*(-n) = [e(n)*h(n)+w(n)]*e^*(-n)$$

$$\Phi_{e,r}(n) = \Phi_{e,e^*h}(n) + \Phi_{e,w}(n)$$

$$= \Phi_{e,e}(n)*h(n) + \Phi_{e,w}(n)$$

The result of the correlation operation constitutes the estimation of the impulse response of the channel: the quality or the precision of the estimation is all the better if e(n) tends towards h(n). The latter is directly dependant on the choice of transmitted sequence e(n); to optimise the estimation process, the signal e(n) should be chosen in such a way that $\Phi_{e,e}(n)$ tends towards k·$\delta(n)$, k being a real number, and that $\Phi_{e,w}(n)/\Phi_{e,e}(n)$ tends towards zero. In fact, in this case, the estimation of the channel becomes:

$$\Phi_{e,r}(n) = k \cdot \delta(n)*h(n) + \Phi_{e,w}(n)$$

$$= k \cdot h(n) + \Phi_{e,w}(n)$$

$$\Phi_{e,r}(n) \approx k \cdot h(n)$$

It has been demonstrated that no single sequence exists for which the function of a periodic auto-correlation $\Phi_{e,e}(n)$ tends toward k·$\delta(n)$.

SUMMARY OF THE INVENTION

One object of the present invention consists in using pairs of complementary sequences which have the property that the sum of their auto-correlations is a perfect Dirac function. Let s(n) and g(n), n=0,1, . . . , N−1 be a pair of complementary sequences:

$$\Phi_{s,s}(n)+\Phi_{g,g}(n)=k.\delta(n) \quad (1)$$

Several methods of constructing such complementary sequences are known in the literature: Golay complementary sequences, polyphase complementary sequences, Welti sequences, etc. By way of information, one will be able to refer, in this connection, to the following technical documents which deal with the introduction to complementary sequences and, in particular, to Golay complementary sequences as well as to a Golay correlator:

1) "On a periodic and periodic complementary sequences" by Feng K., Shiue P. J. -S., and Xiang Q., published in the technical journal IEEE Transactions on Information Theory, Vol. 45, no. 1, January 1999,
2) "Korrelationssignale" by Lüke H. -D, published in the technical journal ISBN 3-540-54579-4, Springer-Verlag Heidelberg New York, 1992,
3) "Polypbase Complementary Codes" by R. L. Frank, published in the technical journal IEEE Transactions on Information Theory, November 1980, Vol. IT26, no. 6,
4) "Multiphase Complementary Codes" by R. Sivaswamy, published in the technical journal IEEE Transactions on Information Theory, September 1978, Vol. IT-24, no. 5,
5) "Efficient pulse compressor for Golay complementary sequences" by S. Z. Budissin, published in the technical journal Electronics Letters, Vol. 27, no. 3, January 1991,
6) "Complementary Series" by M. J. Golay, published in the technical journal IRE Trans; on Information Theory"Vol. IT-7, April 1961,
7) "Efficient Golay Correlator" by B. M. Popovic, published in the technical journal IEEE Electronics Letters, Vol. 35, no. 17, August 1999.

Reference can also be made to the descriptions of the documents U.S. Pat. Nos. 3,800,248, 4,743,753, 4,968,880, 5,729,612, 5,841,813, 5,862,182 and 5,961,463.

The property of complementary sequences in having a perfect sum of autocorrelations is illustrated in FIG. 2, taking, by way of example, a pair of Golay complementary sequences of length N=16 bits.

In FIG. 2 are plotted on the x-co-ordinates the time shifts in relation to perfect synchronisation. The possible shifts are numbered from 1 to 31 for the pair of sequences s(n) and g(n), and on the y-co-ordinates the correlations from −5 to +35. The curve in dashes corresponds to the auto-correlation $\Phi_{s,s}(n)$ of the sequence s(n); the curve in a dot-dash line to the auto-correlation $\Phi_{g,g}(n)$ of the sequence g(n): and the curve in an unbroken line to the sum of the auto-correlations $\Phi_{s,s}(n)$ and $\Phi_{g,g}(n)$. One can see that the curve in an unbroken line merges with the axis of the x-co-ordinates between points 0 and 15 and points 17 and 31, but it corresponds practically to a Dirac function between points 15 to 17.

The theoretically perfect auto-correlation properties of these complementary sequences may, however, only be exploited if their transmission can be ensured in such a manner that the occurrence of inter-correlations $\Phi_{s,g}(n)$ and /or $\Phi_{g,s}(n)$ is avoided.

According to one feature of the invention, a method is provided of estimating a transmission or telecommunications channel, in which method a composite signal of complementary sequences is used and in which a pair of complementary sequences s(n) and g(n) is transmitted after having multiplexed them in phase.

According to another feature of the invention, a method is provided of constructing the composite signal from a pair of polyphase complementary sequences s(n) and g(n) which are multiplexed in phase, this method making it possible to exploit the property $\Phi_{s,s}(n)+\Phi_{g,g}(n)$ mentioned in the relation (1) above.

According to another feature, the composite signal is made up of two polyphase complementary sequences s(n) and (g(n) transmitted with a phase shift between them of 90°, i.e. the transmitted composite signal e(n) is in the form of the relation (2) below:

$$e(n)=e^{j\Phi}.(s(n)+j.g(n)) \quad (2)$$

with an initial, fixed and known phase shift $\Phi$.

In the case of binary complementary sequences s(n) and g(n), with a number of phases P equal to 2, i.e. the case of Golay complementary sequences, the transmitted signal e(n) is in the form of a signal 2P-PSK, or 4-PSK, as FIG. 3 shows in the complex plane. FIG. 3 represents, id the complex plane (R,I), the transmitted composite signal e(n), of which the values 0 or 1 taken by each component s(n), g(n) are respectively represented by the ends of a corresponding segment S and G. Segments S and G are out of phase with one another by II/2.

In the more general case of polyphase complementary sequences with a number of phases P greater than 2, the transmitted signal e(n) takes the form of a signal (2P)-PSK.

According to another feature, a device is provided which is intended to generate the composite signal according to relation (2) and which comprises a first generator capable of generating the first sequence s(n), with n varying from 0 to N−1, the output of which is connected to the first input of an adder, and a second generator capable of generating the second sequence g(n), with n varying from 0 to N−1, the output of which is connected to the input of a first circuit shifting phase by 90°, the output of which is connected to the second input of the adder, the output of the adder being connected to the input of a second circuit shifting phase by $\Phi$ which delivers the composite signal.

The features of the present invention mentioned above, as well as others, will appear more clearly in reading the description of embodiments, said description being made in connection with the attached drawings, amongst which:

DETAILED DESCRIPTION OF THE PREFERRED EMBODIMENTS

Figure 4:
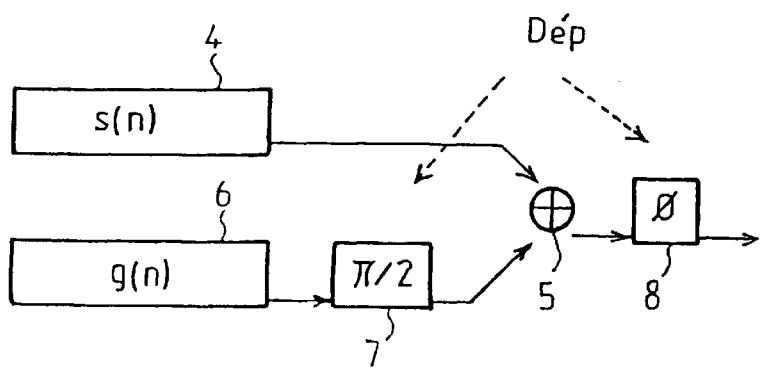
FIG. 4 is the diagram of an embodiment of the device provided to generate the composite sequence of the invention.

The device shown in FIG. 4 is intended to produce the composite signal according to relation (2), i.e.

$$e(n)=e^{j\Phi}.(s(n)+j.g(n)) \quad (2)$$

This device comprises a first generator 4 capable of generating the first sequence s(n), with n varying from 0 to N−1, the output of which is connected to the first input of an adder 5, and a second generator 6 capable of generating the second sequence g(n), with n varying from 0 to N−1, the output of which is connected to the input of a first phase-shifting circuit, 7, supplying a phase shift of 90°, the output of which is connected to the second input of the adder 5, the output of the adder 5 being connected to the input of a second phase-shifting circuit 8 which supplies the phase shift Φ and which delivers the composite signal e(n).

Figure 1:
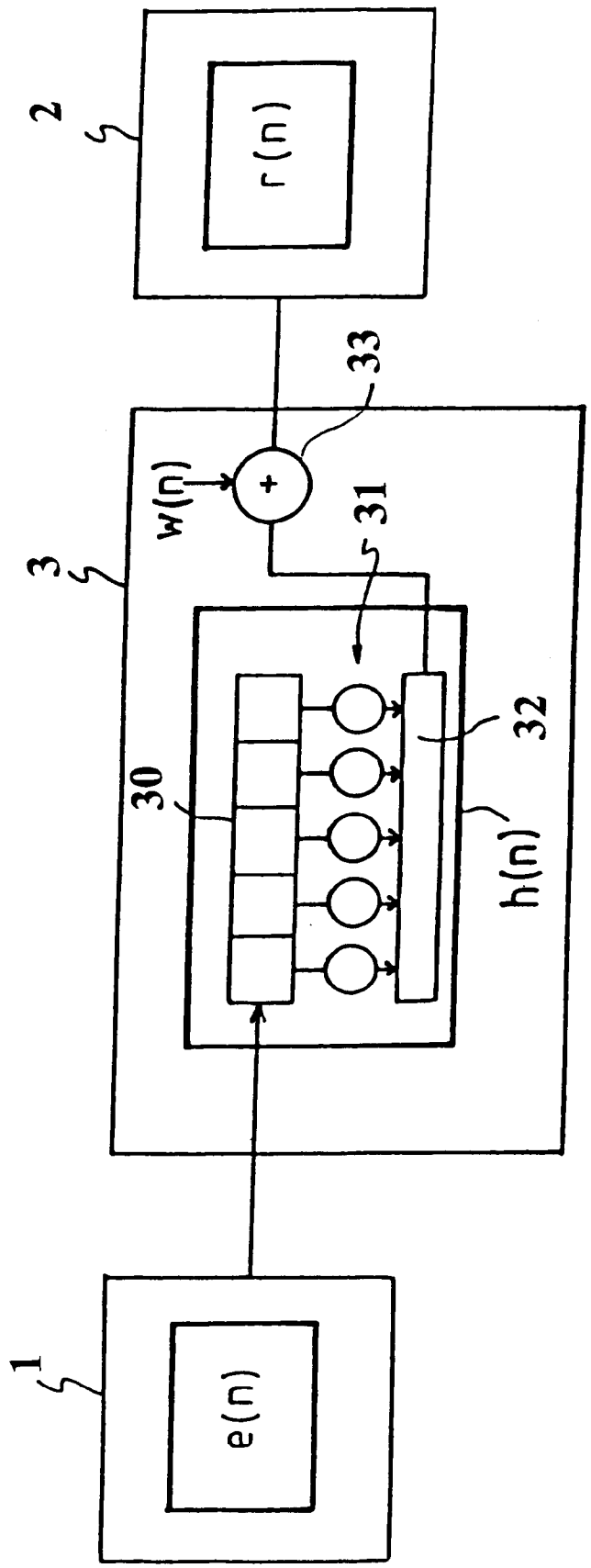
FIG. 1 a background art diagram of a discrete model of a transmission channel.
Figure 2:
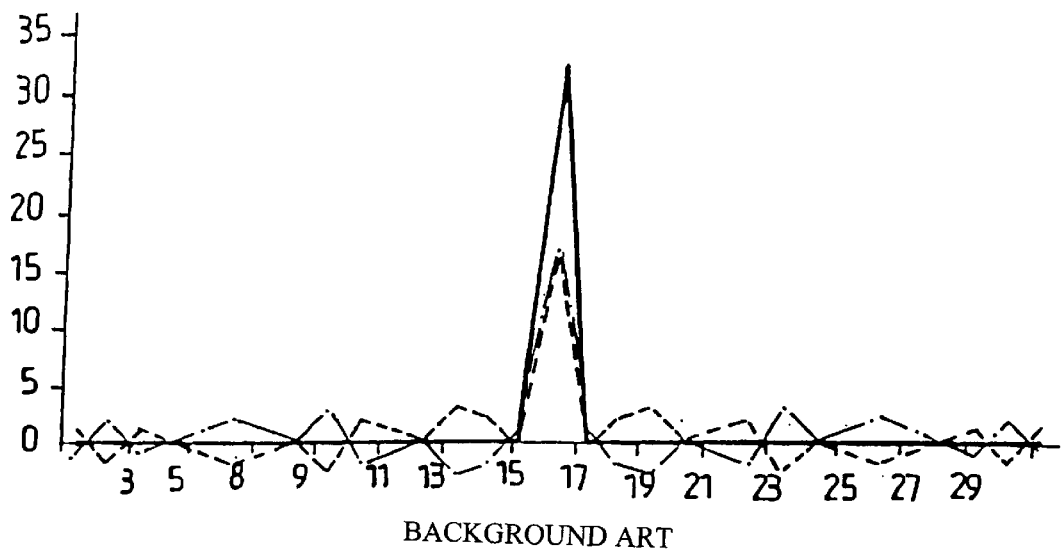
FIG. 2 is a background art curve illustrating the auto-correlation of two Golay complementary sequences and the sums of their auto-correlations.
Figure 3:
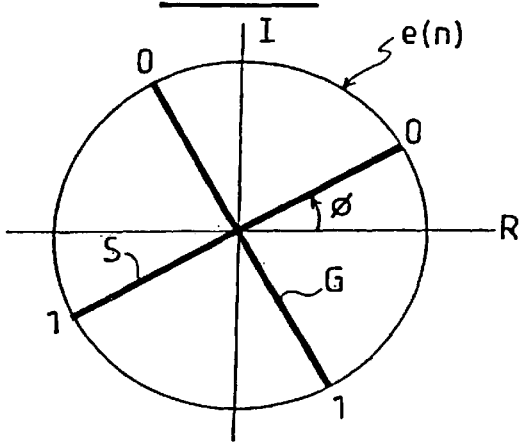
FIG. 3 illustrates a method of multiplexing in phase two complementary sequences, according to the invention.
Figure 5:
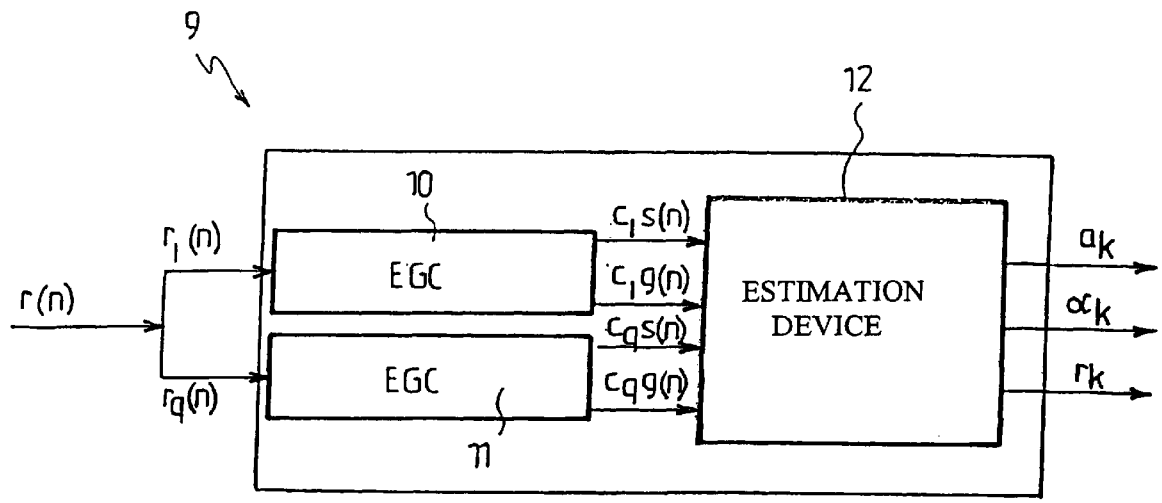
FIG. 5 is a block diagram showing a circuit for processing by correlation, connected in series with a device for estimating the channel, the processing circuit receiving the signal r(n)

FIG. 5 shows the general structure of a signal processing circuit 9, to the input of which is applied the signal r(n) received in the receiver 2, FIG. 1, coming from the transmission channel 3.

Passing into a multipath channel, the total impulse response of which is:

$$h(n) = \sum_{k=1}^{L} a_k \delta(n - r_k) e^{j\alpha_k}$$

the received signal r(n) becomes:

$$r(n) = \sum_{k=1}^{L} a_k \cdot e^{j\alpha_k} \cdot e(n - r_k)$$

$$= \sum_{k=1}^{L} a_k \cdot e^{j(\alpha_k + \phi)} \cdot (s(n - r_k) + j \cdot g(n - r_k))$$

$$= r_I(n) + j \cdot r_Q(n)$$

The real and imaginary parts of the received signal r(n) are expressed in the following manner:

$$r_I(n) = \text{Re}\left\{\sum_{k=1}^{L} a_k \cdot (\cos(\alpha_k + \phi) + j \cdot \sin(\alpha_k + \phi)) \cdot (s(n - r_k) + j \cdot g(n - r_k))\right\} \quad (3)$$

$$= \sum_{k=1}^{L} (a_k \cdot \cos(\alpha_k + \phi) \cdot s(n - r_k) - a_k \cdot \sin(\alpha_k + \phi) \cdot g(n - r_k))$$

$$r_Q(n) = \text{Im}\left\{\sum_{k=1}^{L} a_k \cdot (\cos(\alpha_k + \phi) + j \cdot \sin(\alpha_k + \phi)) \cdot (s(n - r_k) + j \cdot g(n - r_k))\right\}$$

$$= \sum_{k=1}^{L} (a_k \cdot \cos(\alpha_k + \phi) \cdot s(n - r_k) + a_k \cdot \sin(\alpha_k + \phi) \cdot g(n - r_k))$$

The processing circuit 9 is made up of two correlators 10 and 11 and an estimation device 12. The input of the processing circuit 9 receives the signal r(n) and applies the real part $r_I(n)$ to correlator 10 which proceeds separately to correlation with the two sequences s(n) and g(n), and the imaginary part $r_Q(n)$ to correlator 11 which proceeds likewise to correlation with the two sequences s(n) and g(n), Thus, at the respective outputs of correlators IO and 11, signals are obtained which contain the contributions of the auto-correlations of s(n) and g(n), and the contributions of their inter-correlations, and which are mentioned below:

$$c_I^s(n) = \quad (4)$$

$$\sum_{k=1}^{L} (a_k \cdot \cos(\alpha_k + \phi) \cdot \varphi_{s,s}(n - r_k) - a_k \cdot \sin(\alpha_k + \phi) \cdot \varphi_{g,s}(n - r_k))$$

$$c_I^g(n) =$$

$$\sum_{k=1}^{L} (a_k \cdot \cos(\alpha_k + \phi) \cdot \varphi_{s,g}(n - r_k) - a_k \cdot \sin(\alpha_k + \phi) \cdot \varphi_{g,g}(n - r_k))$$

$$c_Q^s(n) =$$

$$\sum_{k=1}^{L} (a_k \cdot \sin(\alpha_k + \phi) \cdot \varphi_{s,s}(n - r_k) + a_k \cdot \cos(\alpha_k + \phi) \cdot \varphi_{g,s}(n - r_k))$$

$$c_Q^g(n) = \sum_{k=1}^{L} (a_k \cdot \sin(\alpha_k + \phi) \cdot \varphi_{s,g}(n - r_k) + a_k \cdot \cos(\alpha_k + \phi) \cdot \varphi_{g,g}(n - r_k))$$

of which the two first $c_I^s(n)$ and $c_I^g(n)$ are delivered by correlator 10, and the last two $c_Q^s(n)$ and $c_Q^s(n)$ are delivered by correlator 11. These four signals are applied to the estimation device 12.

Figure 6:
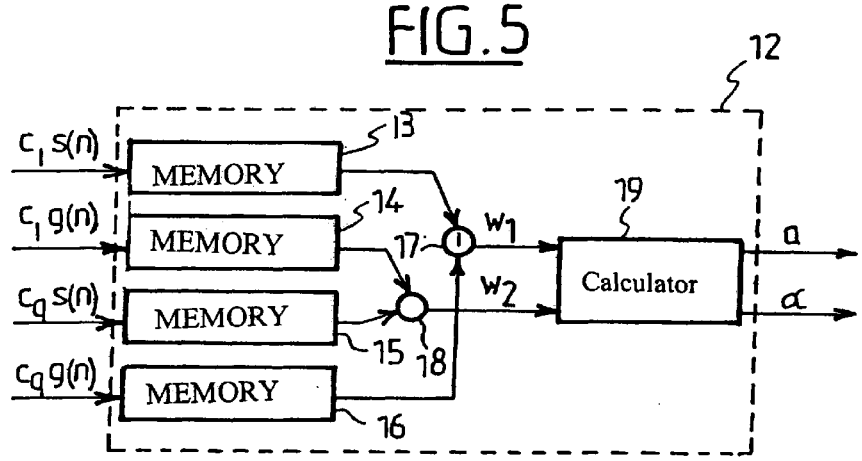
FIG. 6 is a block diagram showing an embodiment of a device for single-path channel estimation.

In a first case, that of device 12 of FIG. 6, it was considered that the transmission channel 3 of FIG. 1 was a single-path channel or even a multipath transmission channel, of which it is not possible to distinguish the different paths, or a multipath channel, of which one of the paths is very powerful in comparison with all the other paths. In this case, the coefficient L used in the relation of the preamble:

$$r(n) = e(n) * h(n) + w(n)$$

$$= e(n) * \sum_{k=1}^{L} a_k \delta(n - r_k) e^{j\alpha_k} + w(n)$$

$$= \sum_{k=1}^{L} a_k e(n - r_k) e^{j\alpha_k} + w(n)$$

is equal to one, and if the arrival time $r_j$ is known, the correlation values obtained by the above relations (4) can be combined in a simple manner, which makes it possible to determine $a_j$ and $\alpha_j$ via the estimation device 12 shown in FIG. 6.

The estimation device of FIG. 6 comprises four memories FiFo 13 to 16, memory 13 receiving the signal $c_I^s(n)$, memory 14 the signal $c_I^g(n)$, memory 15 the signal $c_Q^s(n)$ and memory 16 the signal $c_Q^g(n)$. For each of these signals, all the 2N−1 correlation values centred on the known arrival time of the signal r(n) are calculated and saved in memory. The outputs of memories 13 and 16 are respectively connected to the two inputs of an adder circuit 17, whilst the outputs of memories 14 and 15 are respectively connected to the two inputs of a subtracter circuit 18. The output of circuit 17 delivers the signal $w_1$, whilst the output of circuit 18 delivers the signal $w_2$. These two signals are applied to a circuit 19 for calculating a and α.

In calculating the signals $w_1$ and $w_2$ as the relations (5) indicate below:

$$w_1(m) = (c_I^s(-m))^* + c_Q^g(m) = a_1 \cdot \cos(\alpha_1 + \phi) \cdot ((\Phi_{s,s}(-m))^* + \Phi_{g,g}(m)) + a_1 \sin(\alpha_1 + \Phi) \cdot (\Phi_{s,g}(m) - (\Phi_{g,s}(-m))^*)$$

$$w_2(m) = (c_Q^s(m))^* - c_I^g(-m) = a_1 \sin(\alpha_1 + \phi) \cdot (\Phi_{s,s}(m) + (\Phi_{g,g}(-m))^*) + a_1 \cos(\alpha_1 + \Phi) \cdot (\Phi_{g,s}(m) - (\Phi_{s,g}(-m))^*) \quad (5)$$

where m=−N+1, −N+2, . . . N−2, N−1 is chosen as the index for the correlation values calculated and saved in memory, in this order.

With the two following relations:

$$\Phi_{s,s}(m)=\Phi_{s,s}^*(-m)$$

$$\Phi_{s,g}(m)=\Phi_{g,s}^*(-m)$$

which are valid for all s(n) and g(n) sequences, equation (5) is simplified and one obtains:

$$w_1(m)=a_1 \cdot \cos(\alpha_1+\phi) \cdot (\Phi_{s,s}(m)+\Phi_{g,g}(m))$$

$$w_2(m)=a_1 \cdot \sin(\alpha_1+\phi) \cdot (\Phi_{s,s}(m)+\Phi_{g,g}(m)) \quad (6)$$

These two signals are thus in the form of a Dirac weighted by the channel coefficients, from which the attenuation and the phase shift cain be obtained, in the calculating circuit 19, by the relations:

$$\alpha_1 = \tan^{-1}\left(\frac{w_2(n-v)}{w_1(n-v)}\right) - \phi$$

$$a = \frac{w_1(n-v)}{\cos(\alpha_1+\phi)} \quad \text{or} \quad a = \frac{w_2(n-v)}{\sin(\alpha_1+\phi)}$$

with the initial known phase shift $\Phi$.

Figure 7:
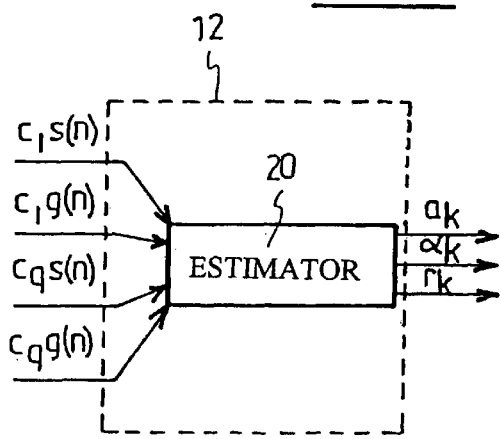
FIG. 7 is a block diagram showing another embodiment of a device for multipath channel estimation.

In the more general case shown in FIG. 7, the signals $c_I^s(n)$, $c_I^g(n)$, $c_Q^s(n)$ and $c_Q^s(n)$ are applied respectively to the four inputs of a circuit 20 which calculates the different coefficients $a_k$ and $\alpha_k$, determines $r_k$ and delivers them to its outputs.

Indeed, in the case of a multipath transmission channel, it is not possible to eliminate the inter-correlation terms which one had in the relations (4) above. With an appropriate circuit 20, it is nevertheless possible to obtain estimations of coefficients of the transmission channel.

Calculating from the equations (4), $$w_1(n) = c_I^s(n) + c_Q^g(n)$$
$$= \sum_{k=1}^{L} \begin{pmatrix} a_k \cdot \cos(\alpha_k+\phi) \cdot (\varphi_{s,s}(n-r_k) + \varphi_{g,g}(n-r_k)) - \\ a_k \cdot \sin(\alpha_k+\phi) \cdot (\varphi_{s,g}(n-r_k) - \varphi_{g,s}(n-r_k)) \end{pmatrix}$$

$$w_2(n) = c_Q^s(n) - c_I^g(n)$$
$$= \sum_{k=1}^{L} \begin{pmatrix} a_k \cdot \sin(\alpha_k+\phi) \cdot (\varphi_{s,s}(n-r_k) + \varphi_{g,g}(n-r_k)) + \\ a_k \cdot \cos(\alpha_k+\phi) \cdot (\varphi_{g,s}(n-r_k) - \varphi_{s,g}(n-r_k)) \end{pmatrix}$$

The two signals are in the form of a Dirac weighted by the channel coefficients plus other terms of inter-correlation between the complementary sequences s(n) and g(n).

With $$z_1(n) = w_1(n) + w_2(n)$$
$$= \sum_{k=1}^{L} \begin{pmatrix} a_k \cdot (\cos(\alpha_k+\phi) + \sin(\alpha_k+\phi)) \cdot (\varphi_{s,s}(n-r_k) + \varphi_{g,g}(n-r_k)) + \\ a_k \cdot (\sin(\alpha_k+\phi) - \cos(\alpha_k+\phi)) \cdot (\varphi_{g,s}(n-r_k) + \varphi_{s,g}(n-r_k)) \end{pmatrix}$$

$$z_2(n) = w_1^2(n) + w_2^2(n)$$
$$= a_k^2 \cdot (\varphi_{s,s}(n-r_k) + \varphi_{g,g}(n-r_k))^2 + \text{secondary terms}$$

the delay $r_k$ are derived in an obvious manner and the attenuations and the phases can be determined by:

$$a_k = \frac{\sqrt{z_2(n)}}{2N}$$

$$\alpha_k = -\left(\cos^{-1}\left(\frac{z_1(n)}{2\sqrt{2} \cdot N}\right) + \phi - \frac{\pi}{4}\right)$$

What is claimed is:

1. A method for estimating responses in a transmission channel, comprising:

constructing a composite signal of complementary sequences s(n) and g(n) such that the complementary sequences have the characteristics, $$\Phi_{s,s}(n)+\Phi_{g,g}(n)=k \cdot \delta(n),$$

where a first sequence $\Phi_{s,s}(n)$ represents an auto-correlation of s(n), a second sequence $\Phi_{g,g}(n)$ represents an auto-correlation of g(n), $\delta(n)$ represents a dirac delta function, and k represents a scale factor, transmitting as said composite signal a pair of said complementary sequences s(n) and g(n) into the transmission channel after having multiplexed said pair of complementary sequences in phase; and estimating coefficients of the transmission channel after said step of transmitting the pair of complementary sequences s(n) and g(n) by correlating respective received signals associated with said complementary sequences s(n) and g(n) to calculate an attenuation and a phase shift of said composite signal.

2. The method according to claim 1, wherein said constructing comprises:

constructing the composite signal from a pair of poly-phase complementary sequences.

3. The method according to claim 2, wherein said transmitting comprises:

transmitting the composite signal constructed from a pair of poly-phase complementary sequences with a phase shift separation of 90°, the composite signal e(n) being transmitted in a form, $$e(n)=e^{j\Phi} \cdot (s(n)+j \cdot g(n)),$$

where $\Phi$ represents an initial fixed and known phase shift and j is the imaginary number.

4. The method according to claim 1, wherein said estimating coefficients of the transmission channel comprises:

estimating coefficients of a telecommunications channel.

5. A device for generating a composite signal e(n) having a form, $$e(n)=e^{j\Phi} \cdot (s(n)+j \cdot g(n)),$$

where s(n) and g(n) represent first and second poly-phase complementary sequences transmitted with a phase shift separation of 90°, $\Phi$ represents an initial fixed and known phase shift, and j is the imaginary number, said device comprising:

a first generator configured to generate the first sequence s(n), with n varying from 0 to N−1, where N represents a length of the first sequence s(n);

an adder configured to produce said composite signal e(n);

an output of the first generator connected to a first input of the adder;

a second generator configured to generate the second sequence g(n), with n varying from 0 to N−1, where N represents a length of the second sequence g(n);

a first circuit configured to phase shift 90° an output of the second generator;

said output of the second generator connected to an input of the first circuit;

an output of the first circuit connected to a second input of the adder;

second circuit configured to phase shift by phase angle Φ an output of the adder;

said output of the adder connected to deliver the composite signal e(n) into a transmission channel; and said composite signal e(n) delivered to the transmission channel providing an estimate of coefficients of the transmission channel by correlating respective received signals from the transmission channel associated with said complementary sequences s(n) and g(n) to estimate an attenuation and a phase shift of said composite signal.

6. The estimation device according to claim 5, further comprising:

a first memory configured to receive a signal $c_I^s(n)$;

a second memory configured to receive a signal $c_I^g(n)$;

a third memory configured to receive a signal $c_Q^s(n)$;

a fourth memory configured to receive a signal $c_Q^g(n)$;

said received signals $c_I^s(n)$, $c_I^g(n)$, $c_Q^s(n)$, and $c_Q^g(n)$ representing inter-correlations between real and imaginary parts of the sequences s(n) and g(n), respectively;

outputs of said first and fourth memories respectively connected to two inputs of an adder circuit;

outputs of said second and third memories respectively connected to two inputs of a subtracter circuit;

an output of the adder circuit configured to deliver a signal $w_1$;

an output of the subtracter circuit configured to deliver a signal $w_2$; and the two signals $w_1$ and $w_2$ applied to a circuit configured to calculate a and α, where a and α represent respectively the attenuation and the phase shift of said composite signal.

7. An estimation device for receiving a received signal r(n) associated with a composite signal of complementary sequences s(n) and g(n), said complementary sequences s(n) and g(n) have the characteristics, $$\Phi_{s,s}(n)+\Phi_{g,g}(n)=k\cdot\delta(n),$$

where one sequence $\Phi_{s,s}(n)$ represents an auto-correlation of s(n), one sequence $\Phi_{g,g}(n)$ represents an auto-correlation of g(n), δ(n) represents a dirac delta function, and k represents a scale factor, said device comprising:

a processing circuit including a first correlator, a second correlator, and an estimation device;

an input of the processing circuit receiving the signal r(n);

said processing circuit configured to apply a real part of the signal r(n), $r_I(n)$, to the first correlator which proceeds simultaneously to a first correlation with the sequences s(n) and g(n);

said processing circuit configured to apply an imaginary part of the signal r(n), $r_Q(n)$, to the second correlator which likewise proceeds to a second correlation with the two sequences s(n) and g(n);

said first and second correlations providing an estimate for an attenuation and a phase shift of composite signal.

* * * * *